(12) United States Patent
Drago et al.

(10) Patent No.: US 6,966,865 B2
(45) Date of Patent: Nov. 22, 2005

(54) HIGH RATIO, REDUCED SIZE EPICYCLIC GEAR TRANSMISSION FOR ROTARY WING AIRCRAFT WITH IMPROVED SAFETY AND NOISE REDUCTION

(75) Inventors: Raymond J. Drago, Glen Mills, PA (US); Joseph W. Lenski Jr., Newtown Square, PA (US); Mark J. Robuck, Chadds Ford, PA (US)

(73) Assignee: The Boeing Company, Chicago, IL (US)

(*) Notice: Subject to any disclaimer, the term of this patent is extended or adjusted under 35 U.S.C. 154(b) by 25 days.

(21) Appl. No.: 10/706,497

(22) Filed: Nov. 10, 2003

(65) Prior Publication Data
US 2005/0130792 A1 Jun. 16, 2005

(51) Int. Cl.⁷ .................................. F16H 1/36
(52) U.S. Cl. ........................ 475/338; 475/342
(58) Field of Search .................. 475/342, 331, 475/338, 341

(56) References Cited

U.S. PATENT DOCUMENTS

| | | | | |
|---|---|---|---|---|
| 3,144,790 A | * | 8/1964 | Davis, Jr. et al. | 475/338 |
| 3,540,311 A | * | 11/1970 | Chillson | 475/342 |
| 5,472,386 A | * | 12/1995 | Kish | 475/338 |
| 5,716,300 A | * | 2/1998 | Sammataro et al. | 475/346 |

* cited by examiner

*Primary Examiner*—Sherry Estremsky
(74) *Attorney, Agent, or Firm*—Thompson Coburn LLP

(57) ABSTRACT

A high ratio, double helical epicyclic gear transmission that is primarily intended for use in rotary wing aircraft employs double helical planet gears to obtain a reduction in size of the transmission, to improve the safety of the transmission, and to reduce the noise created by operation of the transmission.

21 Claims, 13 Drawing Sheets

HIGH RATIO, REDUCED SIZE EPICYCLIC GEAR TRANSMISSION FOR ROTARY WING AIRCRAFT WITH IMPROVED SAFETY AND NOISE REDUCTION

The invention was developed in the course of work done under U.S. government contract NCC2-9019. The U.S. government may possess certain rights in the invention.

BACKGROUND OF THE INVENTION (1) Field of the Invention

The present invention pertains to an epicyclic gear transmission that is primarily intended for use in rotary wing aircraft, i.e., helicopters. More specifically, the present invention pertains to a high ratio, double helical epicyclic gear transmission that employs double helical planet gears to obtain a reduction in size of the transmission, to improve the safety of the transmission, and to reduce the noise created by the operation of the transmission.

(2) Description of the Related Art

In rotary wing aircraft, the main rotor gear transmission is the most critical and usually the heaviest single subsystem in the drive system of the aircraft. This is true for a single or tandem rotor helicopter, or a tilt rotor aircraft.

Currently, the final transmission stage in virtually all main rotor drives is an epicyclic transmission system that typically consist of one or two simple, spur gear planetary stages. These planetary gear stages are composed of a sun gear that is driven by the input shaft of the transmission, multiple planet gears (typically between three and six) that intermesh with the sun gear and are spacially arranged around the periphery of the sun gear, and an orbit gear or internal ring gear that intermeshes with and surrounds the multiple planet gears. The orbit or internal ring gear is generally the fixed member of the epicyclic transmission system. The multiple planet gears are mounted to a carrier which in turn is operatively connected to the output shaft of the transmission. While this basic epicyclic gear transmission provides relatively good power efficiency, it has a tendency to generate high noise levels in operation due to the limited contact ratio of the sun gear and the internal ring gear with the multiple planet gears.

In addition to the undesirable high noise levels generated by the basic epicyclic gear transmission, the load capacity of the epicyclic gear transmission is limited by it being a function of the number of planet gears that can be accommodated inside the internal ring gear. The size of the internal ring gear itself is dependent on the combination of gear ratio requirements and the allowable stress limits of the transmission system. The planet gear bearings, which are typically mounted inside the center bore of each planet gear, must be sized to carry the loads applied to the planet gears and also to allow a minimum thickness of the planet gear rim inside the planet gear teeth that surrounds the planet gear bearings. This requires that the size of the planet gear and the size of the planet gear bearings be optimized as a unit.

Because the gears of the basic epicyclic gear transmission are densely packed to reduce the size of the transmission, a gear tooth failure of one of the gears can generally be very destructive. The high power density provided by an epicyclic gear transmission and the very limited space among the gears of the transmission causes a great deal of consequential damage from a fractured tooth in the transmission. While it would appear that the construction of the epicyclic gear transmission with its multiple planet gears meshing between the sun gear and internal ring gear would provide parallel load paths, which might offer some redundancy in transmission paths through the transmission, the opposite is true. It has been observed that the planet gears themselves provide little in the way of fail safety. The dense positioning of the multiple planet gears between the sun gear and internal ring gear almost assures consequential damage will occur in the transmission due to a gear tooth failure. This is especially true when one considers that once a planet gear loses its load-transmitting capability, the internal load balance between the multiple planet gears is compromised so that the planet gears no longer balance their own radial loads on the sun gear and the internal ring gear.

Despite the limitations of epicyclic gear transmissions cited above, the use of epicyclic gear transmissions in rotary wing aircraft is still desirable for their ability to provide relatively large reduction ratios in a compact package. What is needed to overcome the disadvantages associated with the basic epicyclic gear transmission are design enhancements to the basic design of the transmission that will reduce the weight of the transmission, provide a smaller footprint of the transmission, improve transmission safety and the ability to withstand single gear tooth failures, while decreasing the generated noise level of the transmission, all of which are required for rotary wing aircraft applications.

SUMMARY OF THE INVENTION

The epicyclic gear transmission of the present invention brings together a large number of individual planetary gear system innovations which, taken together, provide improvements in noise reduction and performance of the transmission combined with improved reliability and fail safety of the transmission. The epicyclic gear transmission of the invention makes use of a compound epicyclic gear system with as many as double the number of planet gears sharing the load of the transmission without an increase in the overall diameter of the basic epicyclic gear drive. This reduces the weight of the transmission and provides the transmission with a smaller footprint. The compound epicyclic gear transmission also provides a more fail-safe, quieter gear drive for rotary wing applications.

The epicyclic gear transmission of the invention is provided in several embodiments. Each of the embodiments makes use of interleaved planet gear clusters with there being two or three planet gears on each planet gear shaft. Interleaving the planet gear clusters enables doubling of the number of planet gears in the transmission system. This increases the load capacity of the transmission (almost doubling the load capacity) without decreasing the reduction ratio obtained through the gear transmission and without increasing the diameter of the overall gear transmission. Some axial length is added to the transmission, however, this adds minimal weight and a minimal increase in size.

Using double helical planet gears that are axially staggered in their positions on their planet gear shafts enables doubling the number of planet gears in the epicyclic gear transmission. Because double helical gears require a gap at the apex of their gear teeth to permit the teeth to be ground, they are normally heavier than single helical gears. By staggering the planet gears axially on the planet gear shafts in the transmission, the apex gap between the double helical planet gears on each planet shaft becomes an axial space between the planet gears that can be occupied by an interleaving planet gear of the adjacent planet gear shaft. This enables doubling the number of planet gears that can be used at any gear ratio. Doubling the planet gears significantly increases the load capacity of the transmission. Employing double helical planet gears also results in noise reduction. Employing double helical planet gears on each planet shaft basically creates a dual path transmission system that significantly enhances the survivability and fault tolerance of the gear transmission. The usual detrimental need for providing a large apex gap on a double helical gear is turned into an advantage by providing an axial space between double helical planet gears on each planet shaft that can be occupied by an interleaving planet gear of an adjacent planet gear shaft. The axial spacing between the double helical planet gears on each planet shaft also allows easy manufacturing of the gears while minimizing the weight penalty associated with the need for the axial gap between double helical gears to allow for the cutting tool and grinding wheel runout in manufacturing the gears.

A first embodiment of the epicyclic gear transmission has the basic form of an epicyclic gear system with a sun gear input, a fixed ring gear or internal gear, and a planet gear carrier output. However, each planet gear of the basic epicyclic gear system is replaced by a planet gear cluster that includes double helical planet gears that are axially spaced on each planet gear shaft. The double planet gears on adjacent planet gear shafts are axially staggered and are interleaved, providing two load transmission paths through the transmission without appreciably increasing the footprint or size of the transmission. The sun gear input is provided by four sun gears that mesh with the interleaved double planet gears. The fixed ring gear has four sets of internal teeth that mesh with the interleaved double planet gears. By using this epicyclic gear transmission configuration, a single compound epicyclic stage can be substituted for two simple planetary gear stages, thus providing a reduction in parts count and weight. The double helical gears provide lower noise and improved safety.

A second embodiment of the epicyclic gear transmission is similar to the first embodiment in that it also employs the concept of axially staggered planet gears on each planet gear shaft. However, the second embodiment uses three helical planet gears clustered on each planet gear shaft. Again, the sun gear of the epicyclic gear transmission is the input gear and the ring gear or internal gear is fixed. The sun gear input is provided by a pair of axially spaced sun gears and the ring gear has a pair of axially spaced internal gear teeth.

Two of the three helical planet gears on each planet gear shaft have helical teeth of opposite hands and different helix angles. These two planet gears mesh with the two axially spaced sets of internal helical gear teeth on the ring gear. Providing the two planet gears of each planet gear shaft with gear teeth of opposite hands and different helix angles enables the axially directed thrust load of the three planet gears on each planet gear shaft to be partially or fully balanced. The planet gear of each planet gear shaft that meshes with the sun gear is larger than the two planet gears on each planet gear shaft that mesh with the ring gear. The relative positions of the larger planet gears that mesh with the sun gear are axially staggered on the planet gear shaft from the two planet gears that mesh with the ring gear. This enables the planet gears that mesh with the sun gear to be interleaved as in the first described embodiment, doubling the number of planet gear clusters. The larger planet gear on each planet gear shaft meshing with the sun gear, and the smaller planet gears on each planet gear shaft meshing with the ring gear significantly increases the reduction ratio of the transmission. As in the first embodiment, this epicyclic gear transmission configuration results in a net weight reduction while providing lower noise and improved safety.

A third embodiment of the epicyclic gearing transmission is similar to the second described embodiment in that it employs three helical planet gears on each planet gear shaft. A larger of the three planet gears on each shaft meshes with the input sun gear and a pair of smaller planet gears on each planet gear shaft mesh with the fixed ring gear. However, this embodiment differs from the previously described embodiment in that it requires only one bearing assembly on each planet gear shaft. The previously described embodiments required two bearing assemblies positioned at the opposite ends of each planet gear shaft.

In the third embodiment of the transmission, the planet gears are constructed with helix angles and with axial positions on their planet gear shafts where the planet gears on each shaft become completely self load balancing so that only the one planet bearing on each planet gear shaft is required. This embodiment allows a further reduction in parts count by halving the number of individual planet gear shaft bearing assemblies needed. The larger planet gear on each planet gear shaft is driven by the sun gear. The relative positions of the larger planet gears on adjacent planet gear shafts are axially staggered, enabling the larger planet gears to be interleaved. The smaller pair of planet gears on each planet gear shaft are positioned on axially opposite sides of the larger planet gear. The pair of smaller planet gears mesh with internal gear teeth of the stationary ring gear. The positioning of the smaller planet gear pair on each planet gear shaft on axially opposite sides of the larger planet gear enables the self load balancing of each planet gear shaft and the use of only one bearing assembly on each planet gear shaft.

A fourth embodiment of the epicyclic gear transmission is similar to the second described embodiment except that high profile contact ratio (HCR) spur gears are used as the planet gears that mesh with the sun gear, rather than the single helical gears of the previous embodiment. This configuration of the epicyclic gear transmission simplifies assembly and allows the double helical planet gears that mesh with the ring gear to be true double helicals (helix angles of the pair of helical planet gears on each planet gear shaft are equal but of opposite hand). This configuration eliminates any axial thrust loads on the stationary internal ring gear. HCR gears also provide noise reduction without the additional thrust load that results from helical gears.

The use of the double helical planet gears on each planet gear shaft that mesh with the internal ring gear improves the safety of each of the embodiments of the epicyclic gearing transmission. The double helical gears meshing with the internal ring gear separates the gears into two parts that creates a dual path transmission system that provides some redundancy. If a gear tooth failure occurs, the gear transmission can continue to operate. A gear tooth failure overloads the remaining gear teeth while the bearings of the planet gear shaft take an increased thrust load. This creates an increase in vibration and noise level in the transmission. The change in the characteristics of the noise and vibration of the transmission signal the occurrence of a failure, thus allowing the aircraft to be landed safely before catastrophic failure occurs.

BRIEF DESCRIPTION OF THE DRAWINGS

Further features of the invention are set forth in the following detailed description of the preferred embodiments of the invention and in the drawing figures wherein.

DETAILED DESCRIPTIONS OF THE PREFERRED EMBODIMENTS

Figure 1:
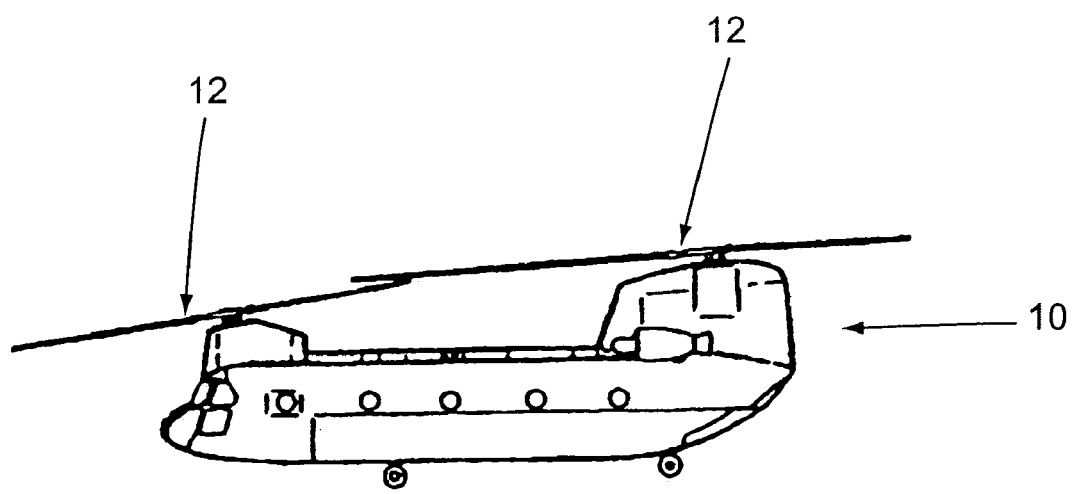
FIG. 1 is a side view of one example of a rotary wing aircraft in which the epicyclic gear transmission of the present invention is employed as the main rotor gear transmission.

The epicyclic gear transmission of the present invention is primarily intended for use in rotary wing aircraft, i.e., helicopters 10 such as that shown in FIG. 1. The invention to be described is provided in several embodiments of epicyclic gear transmissions that drive the main rotors 12 of the rotary wing aircraft. Although a dual rotor aircraft is illustrated as an example in FIG. 1, it should be understood that the epicyclic gear transmission of the invention may be employed as the main rotor drive of single rotor aircraft or tilt rotor aircraft. As explained earlier, the gear transmission of the invention is particularly well suited for use in rotary wing aircraft in that it provides improvements in noise reduction and in the performance of the transmission, combined with improved reliability and fail-safety of the transmission. The gear transmission of the invention makes use of a compound epicyclic gear system with as many as double the number of planet gears sharing the load of the transmission without an increase in the overall diameter of the basic epicyclic gear drive. This reduces the weight of the transmission and provides the transmission with a smaller footprint, two features of the invention that are particularly well suited for use of the transmission in rotary wing aircraft. The compound epicyclic gear transmission also provides a more fail-safe, quieter gear drive for rotary wing applications.

FIGS. 2–5 show a first embodiment of the epicyclic gear transmission of the present invention. The input drive of the transmission is from a motive source 14 of the aircraft that drives an input shaft 16 having a center axis that is also the center axis of the transmission. A sun gear cluster comprised of four sun gears 18, 20, 22, 24 is provided on the input shaft 16. The four sun gears are axially arranged in two pairs. A first pair of the sun gears 18, 22 are double helical gears having opposite hand gear teeth of equal helix angles. The second pair of the sun gears 20, 24 are also double helical gears with opposite hand gear teeth with the same helix angles as the first pair of sun gears.

Each of the sun gears 18, 20, 22, 24 meshes with clusters of planet gears mounted on planet gear shafts 26, 28 of a planet gear carrier 30. The planet gear shafts 26, 28 have center axes that are parallel with the center axis of the input shaft 16. The planet gear carrier 30 is formed integrally with an output shaft 32 of the transmission. In the illustrative embodiment of the invention, there are six planet gear shafts mounted on the carrier 30, with the six planet gear shafts being divided into a first group of three planet gear shafts 26 and a second group of three planet gear shafts 28.

Figure 2:
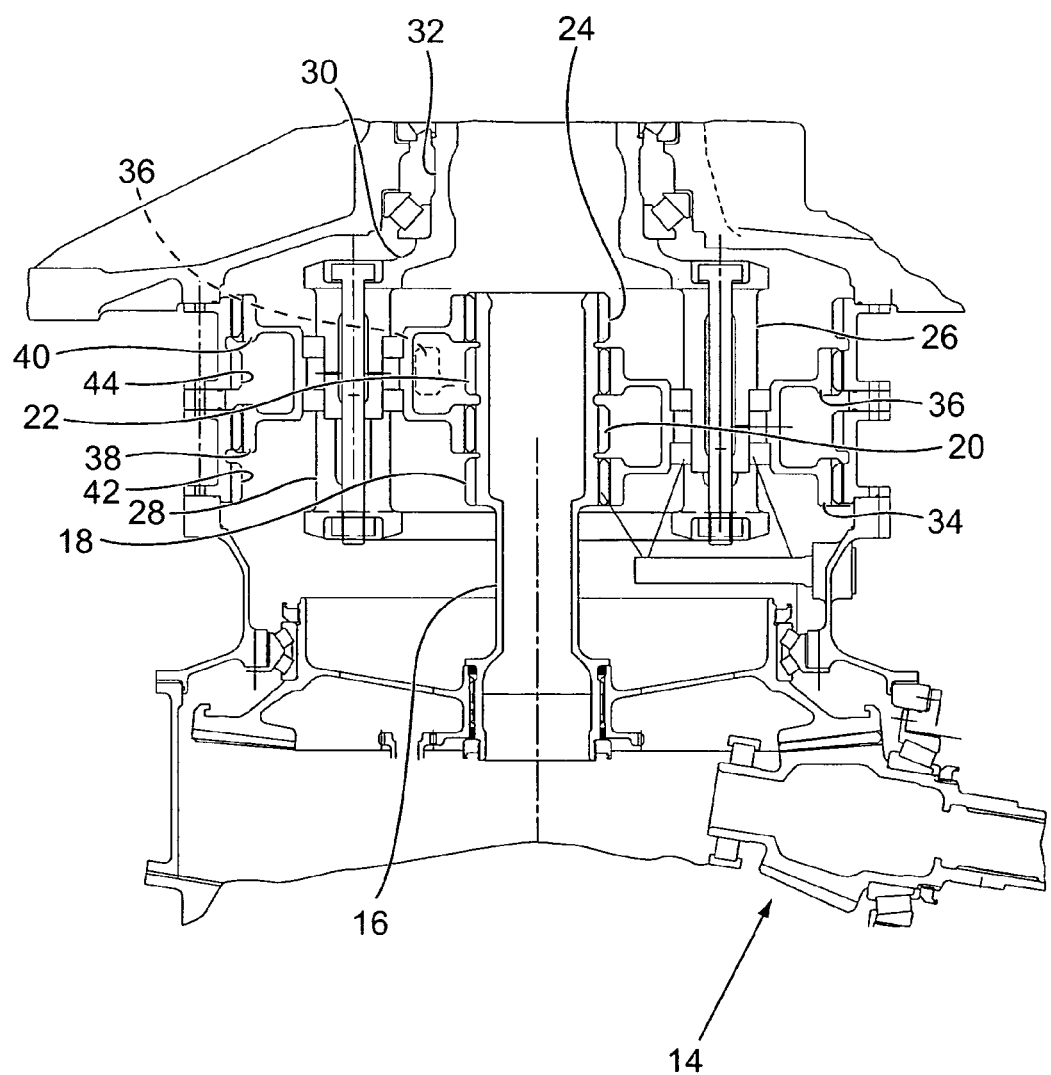
FIG. 2 is a side sectioned view of a first embodiment of the epicyclic gear transmission of the invention.
Figure 3:
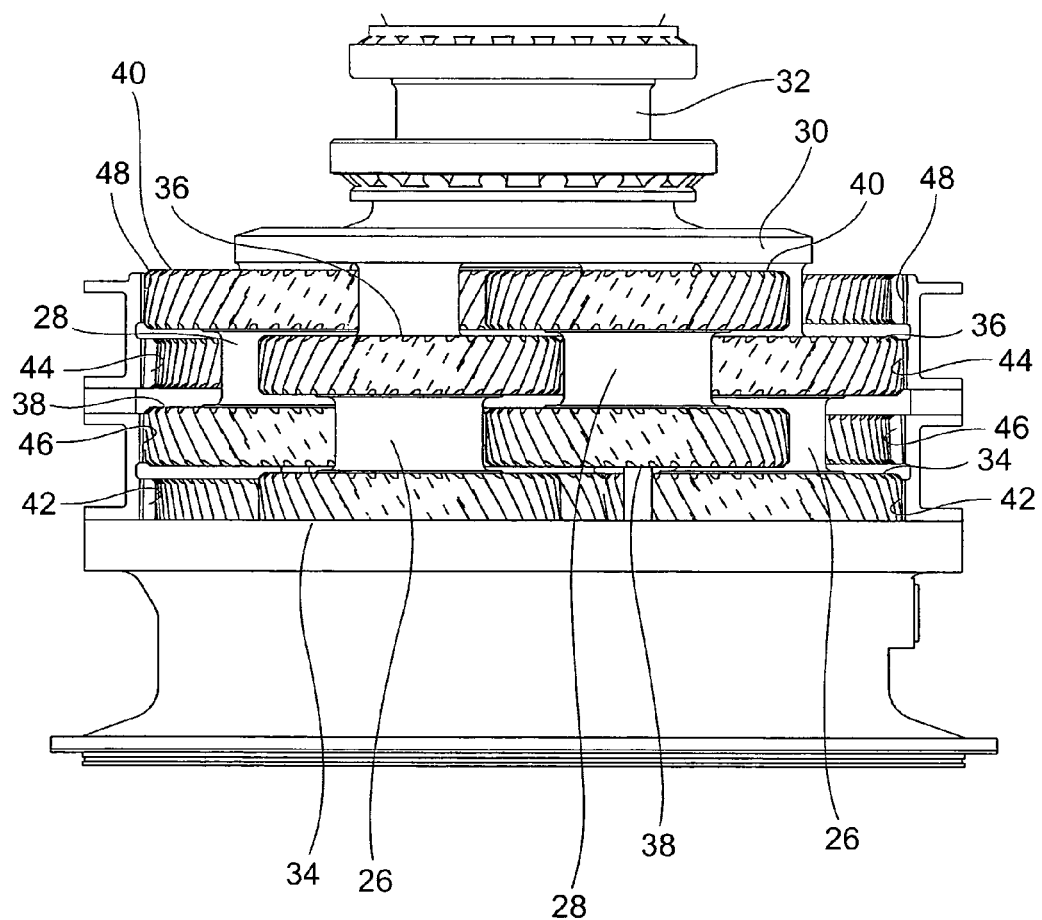
FIG. 3 is a side view of the transmission of FIG. 2.
Figure 4:
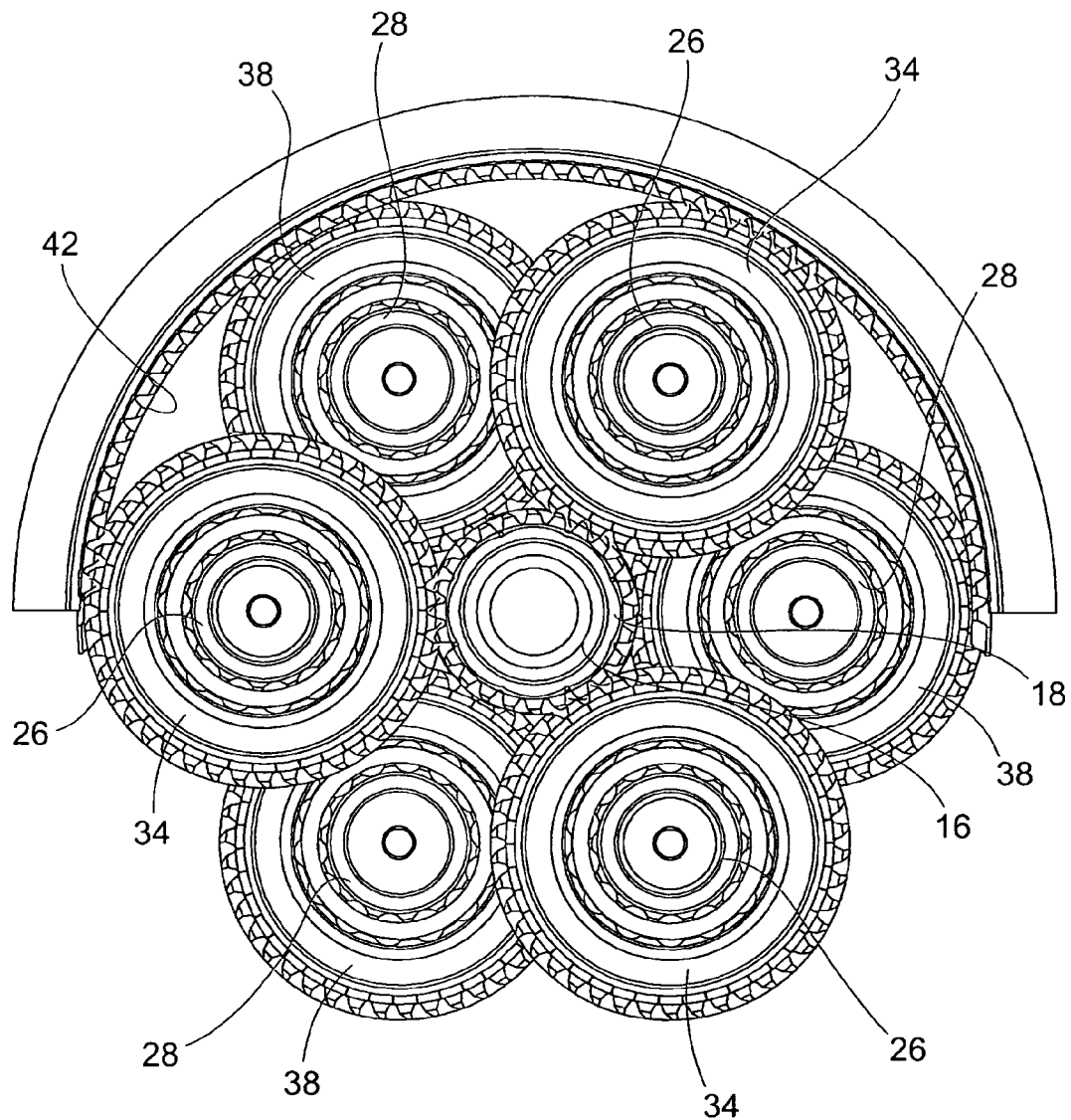
FIG. 4 is a partial view of the input end of the transmission of FIG. 2.
Figure 5:
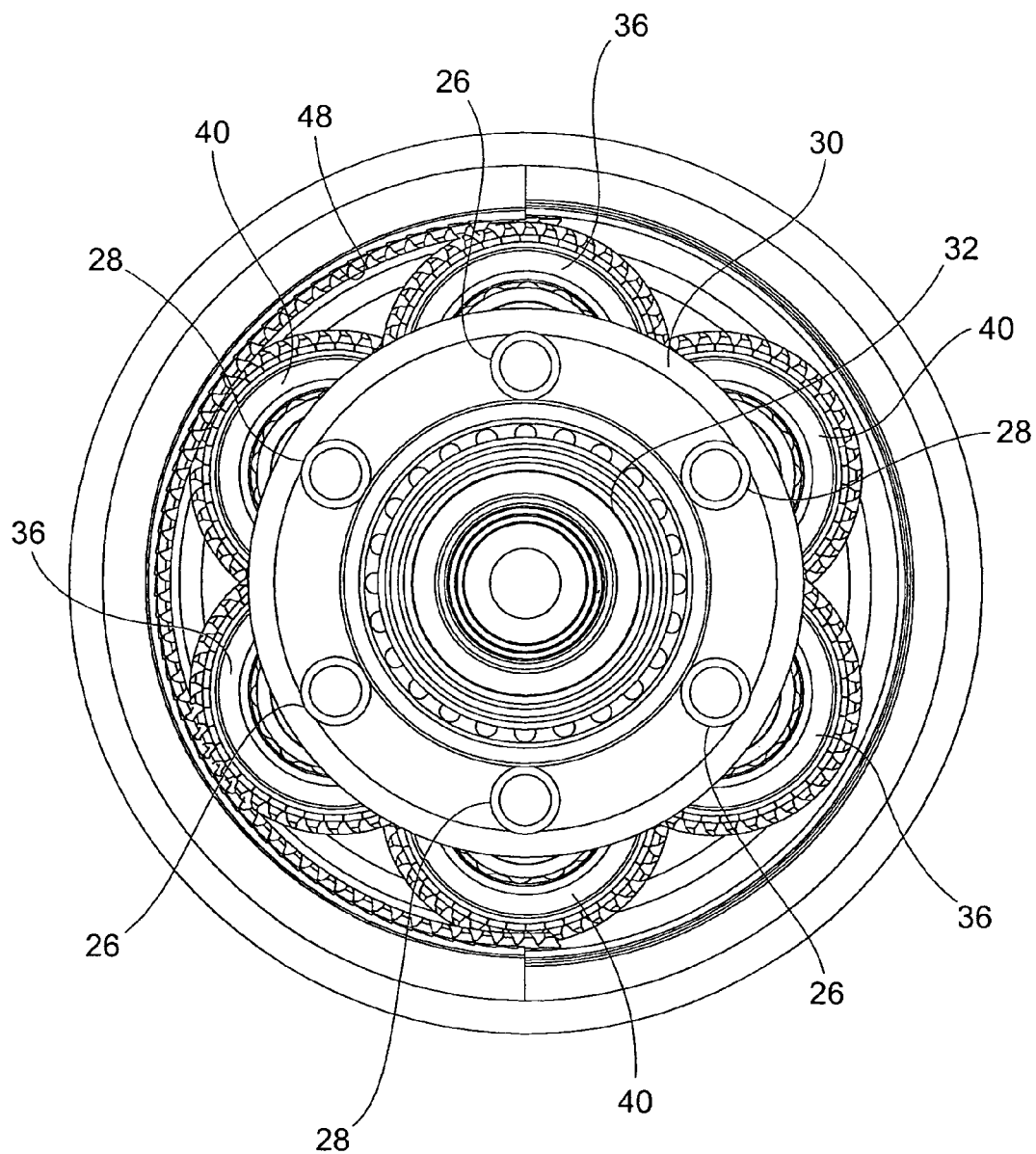
FIG. 5 is a partial view of the output end of the transmission of FIG. 2.

First pairs of planet gears 34, 36 are mounted by bearing assemblies on the planet gear shafts 26 of the first group and second pairs of planet gears 38, 40 are mounted by bearing assemblies on the planet gear shafts 28 of the second group. The pairs of planet gears 34, 36 of the first group are each double helical gears of opposite hand teeth of equal helix angles. The pairs of planet gears 38, 40 of the second group are also each double helical gears of opposite hand teeth having equal helix angles. The planet gears 34, 36 of the first group have an axial spacing between the gears that is dimensioned to receive one of the planet gears 38 of the second group in the axial spacing, and the planet gears 38, 40 of the second group have an axial spacing between the gears that is dimensioned to receive one of the planet gears 36 of the first group in the axial spacing. As best seen in FIG. 2, the pairs of planet gears 34, 36 of the first group are axially positioned on their planet gear shafts 26 in axially staggered positions relative to the pairs of planet gears 38, 40 of the second group mounted on the second planet gear shafts 28. This enables the pairs of planet gears 34, 36 mounted on the first planet gear shafts 26 and the pairs of planet gears 38, 40 mounted on the second planet gear shafts 28 to be arranged in an interleaved relationship shown in FIGS. 3 and 4. The interleaved relationship of the planet gears enables the use of twice the number of planetary gears in the transmission of FIGS. 2–5 than would be used in a basic epicyclic gear transmission having the same sun gear diameter and planet gear diameter as the transmission shown in FIGS. 2–5.

The pairs of planet gears mesh with four ring gears or internal gears 42, 44, 46, 48. The ring gears 42, 44, 46, 48 are fixed to the transmission housing and are coaxial with the center axis of the input shaft 16. A first pair of ring gears 42, 44 mesh with the planet gears 34, 36 of the first group of planet gears, and a second pair of ring gears 46, 48 mesh with the planet gears 38, 40 of the second group of planet gears. The ring gears of the first pair 42, 44 and the second pair 46, 48 are double helical gears of opposite hand teeth having equal helix angles.

By using the double helical planet gears 34, 36, 38, 40 that are staggered in their axial positions and interleaved with each other, the number of planet gears in the transmission can be doubled. Because double helical gears require an axial gap at the apex of the gear teeth to permit the teeth to be ground, they are normally heavier than single helical gears. By axially staggering and interleaving the planet gears, the axial apex gap between each double helical planet gear is almost completely filled with the gear teeth of an adjacent planet gear, enabling doubling of the number of planet gears that can be used at any transmission ratio. This greatly increases the load capacity of the epicyclic gear transmission while providing a large noise reduction combined with improved safety characteristics. The epicyclic gear transmission of FIGS. 2–5 becomes basically a completely dual path system, thus dramatically enhancing survivability and fault tolerance. In addition, the usual detrimental need for a large apex gap on a double helical gear is turned into an advantage by allowing easy manufacturing while minimizing the weight penalty associated with the need for the apex gap in the double helical gears to allow for cutting tool and grinding wheel runout. The use of helical gears in the transmission also reduces the noise of the transmission's operation FIGS. 6–9 show a variation of the epicyclic gear transmission embodiment of FIGS. 2–5 that provides an epicyclic gear transmission with an increased reduction ratio. As in the previously described embodiment, the input drive of the transmission is from a motive source 50 of the aircraft that drives an input shaft 52 having a center axis that is also the center axis of the transmission. A sun gear cluster comprised of two sun gears 54, 56 is provided on the input shaft 52. The pair of sun gears 54, 56 are double helical gears having opposite hand gear teeth of equal helix angles.

Each of the sun gears 54, 56 meshes with clusters of planet gears mounted on planet gear shafts 58, 60 of a planet gear carrier 62. The planet gear shafts 58, 60 have center axes that are parallel with the center axis of the input shaft 52. Each planet gear shaft 58, 60 is mounted to the planet gear carrier 62 by a pair of bearings 64. The planet gear carrier 62 is formed integrally with an output shaft 66 of the transmission. In the illustrative embodiment of the transmission shown in FIGS. 6–9, there are six planet gear shafts 58, 60 mounted on the carrier 62, with the six planet gear shafts being divided into a first group of three planet gear shafts 58 and a second group of three planet gear shafts 60.

Figure 6:
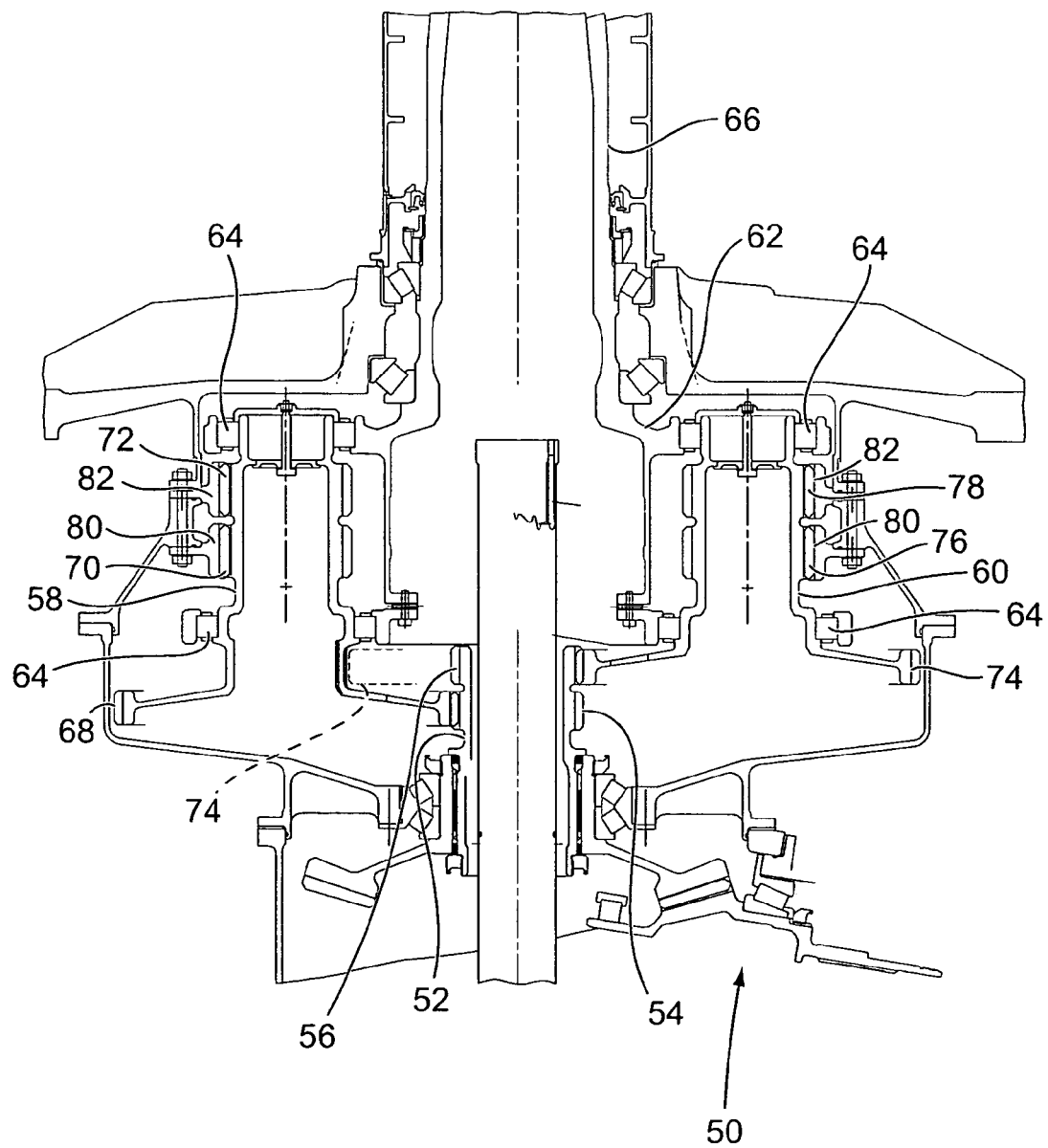
FIG. 6 is a side sectioned view of a further embodiment of the epicyclic gear transmission of the invention.
Figure 7:
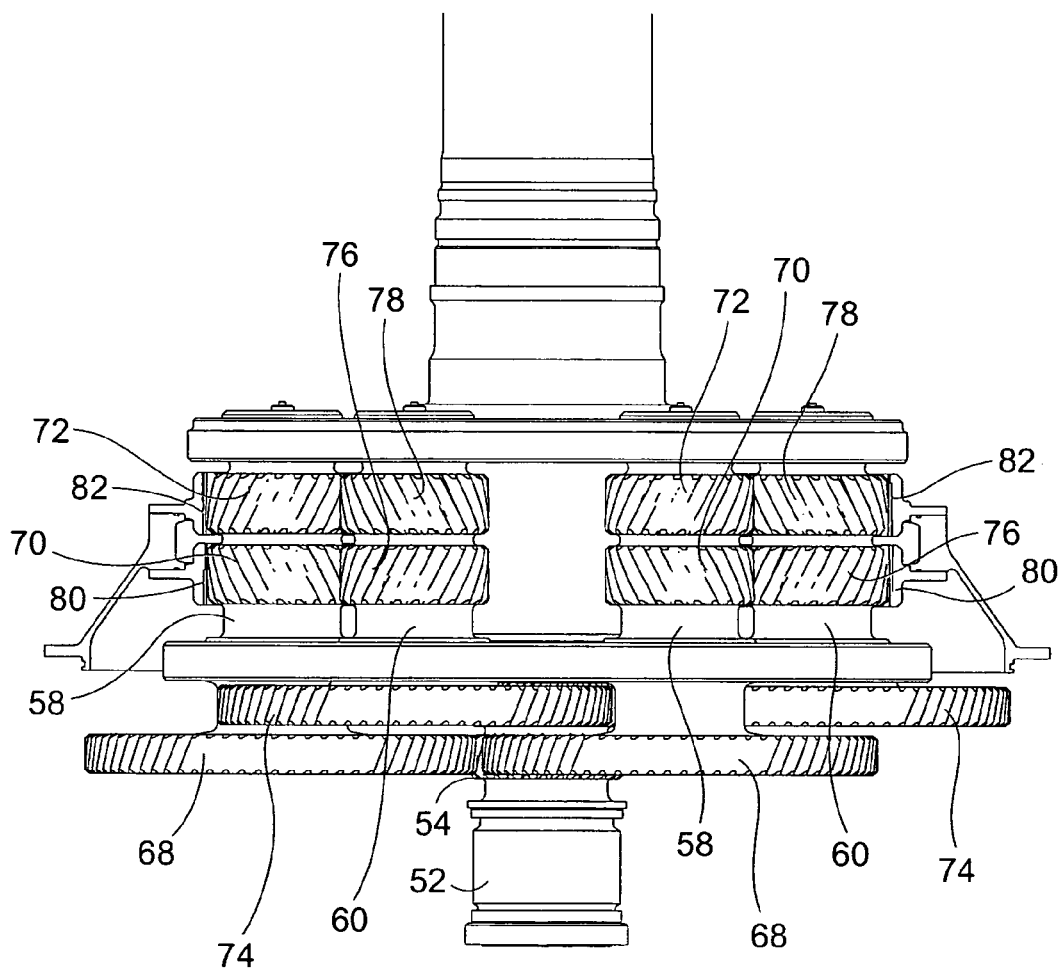
FIG. 7 is a side view of the transmission of FIG. 6.
Figure 8:
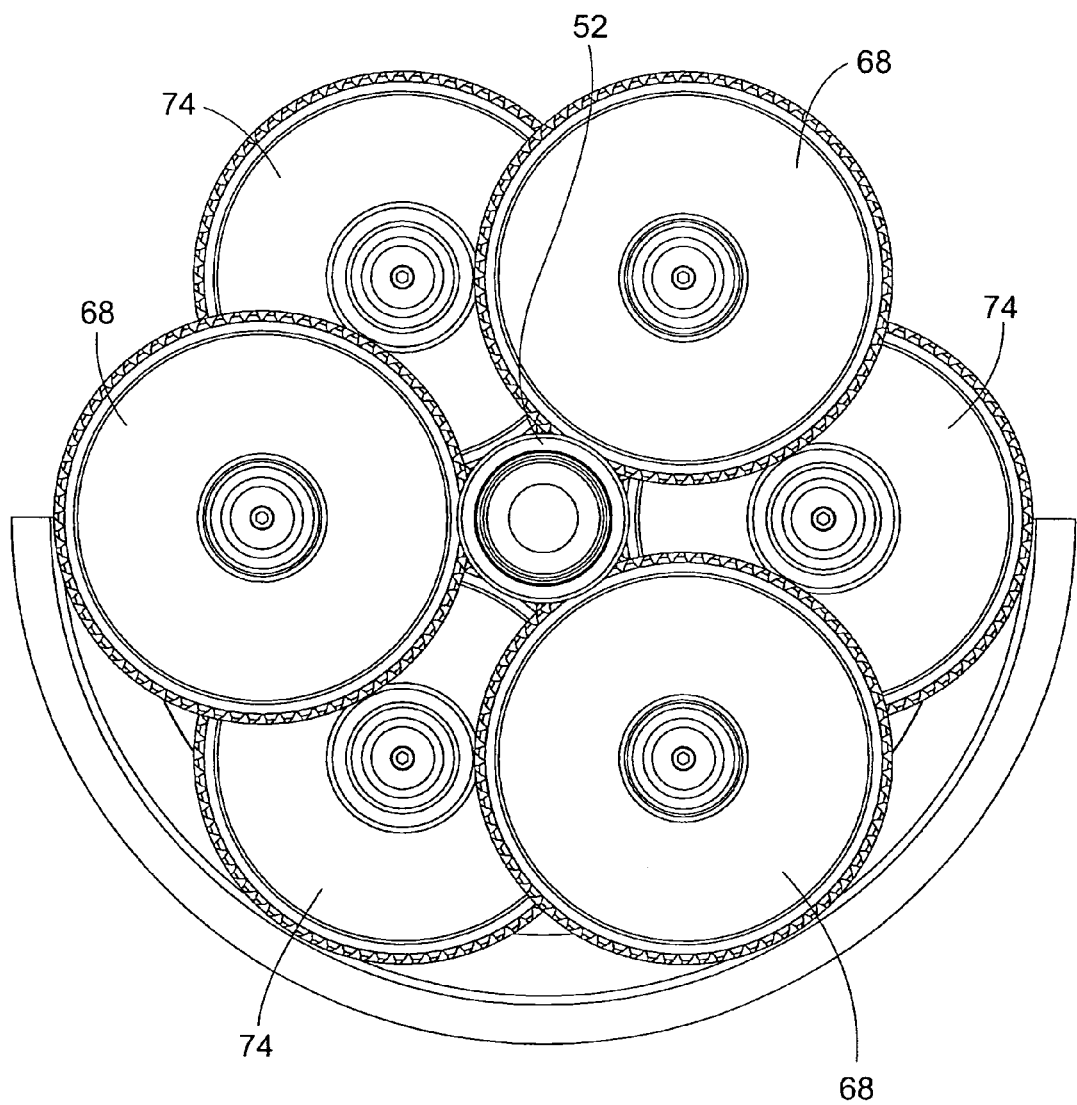
FIG. 8 is a partial view of the input end of the transmission of FIG. 6.
Figure 9:
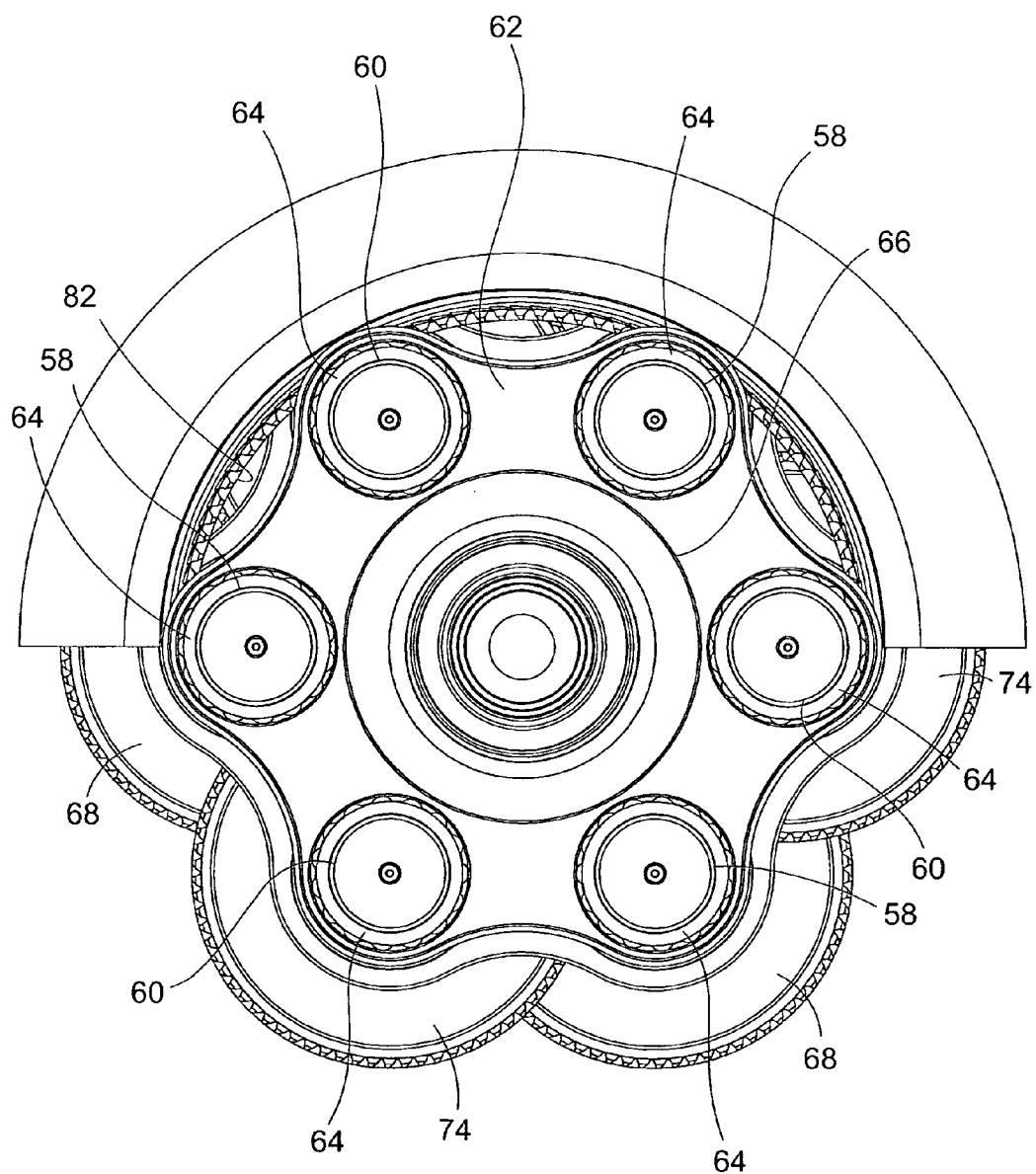
FIG. 9 is a partial view of the output end of the transmission of FIG. 6.

A first cluster of planet gears 68, 70, 72, is mounted on each planet gear shaft 58 of the first group and a second cluster of planet gears 74, 76, 78 is mounted on each planet gear shaft 60 of the second group. Each of the planet gear clusters on each planet gear shaft includes three gears. Each planet gear cluster of the first group includes a larger planet gear 68 that meshes with one of the sun gears 54 and two smaller planet gears 70, 72. Each planet gear cluster of the second group includes a larger planet gear 74 that meshes with the other sun gear 56 and two smaller planet gears 76, 78. As best seen in FIGS. 6 and 7, the smaller planet gears 70, 72, 76, 78 have the same axial positions on their planet gear shafts relative to the gear carrier 62. However, the larger planet gears 68 of the first group and the larger planet gears 74 of the second group are axially staggered on their planet gear shafts. This enables the larger planet gears of the first group 68 to be interleaved with the larger planet gears 74 of the second group. This enables a greater gear reduction by the transmission of FIGS. 6–9 than is provided by the embodiment of the transmission shown in FIGS. 2–5 without increasing the size of the footprint of the transmission. The pairs of smaller planet gears 70, 72 of the first group and the pairs of smaller planet gears 76, 78 of the second group are each double helical gears of opposite hand teeth. The larger planet gears 68 of the first group and the larger planet gears 74 of the second group are also helical gears. The hands of the helical gear teeth of the smaller planet gears 70, 72, 76, 78 and the larger planet gears 68, 74 as well as the helix angles of the gear teeth can be varied to reduce the axial loading on the planet gear shafts 58, 60 or eliminate any axial loading on the shafts. The gear teeth of the larger planet gears 68, 74 could also be spur gear teeth with the gear teeth of the associated pairs of smaller planet gears 70, 72, 76, 78 being double helical gear teeth of opposite hand teeth of equal helix angles.

The pairs of smaller planet gears of the first group 70, 72 and the pairs of smaller planet gears of the second group 76, 78 all mesh with a pair of ring gears or internal gears 80, 82. The ring gears 80, 82 are fixed to the transmission housing and are coaxial with the center axis of the input shaft 52. The ring gears 80, 82 are double helical gears of opposite hand-teeth having equal helix angles.

By employing the larger planet gears 68, 74 that are staggered in their axial positions and interleaved with each other, a larger reduction ratio is provided by the transmission of FIGS. 6–9 without reducing the number of planet gear clusters and planet gear shafts. By doubling the sun gears 54, 56, the smaller planet gears 70, 72 of the first group and the smaller planet gears 76, 78 of the second group, and by doubling the ring gears 80, 82 the load capacity of the transmission is increased and the dual paths through the transmission improve its safety characteristics. The use of helical gears in the transmission also reduces the noise of the transmission's operation.

FIGS. 10–13 show a further embodiment of the epicyclic gear transmission that is similar to the embodiment of the transmission shown in FIGS. 6–9 in that it provides an epicyclic gear transmission with an increased reduction ratio. As in the previously described embodiments, the input drive of the transmission is from a motive source 86 of the aircraft that drives an input shaft 88 having a center axis that is also the center axis of the transmission. A sun gear cluster comprised of two sun gears 90, 92 is provided on the input shaft 88. The pair of sun gears 90, 92 are double helical gears having opposite hand gear teeth of equal helix angles.

Each of the sun gears 90, 92 meshes with clusters of planet gears mounted on planet gear shafts 94, 96 of a planet gear carrier 98. The planet gear shafts 94, 96 have center axes that are parallel with the center axis of the input shaft 88. This embodiment of the transmission differs primarily from the previously described embodiment in that each of the planet gear shafts 94, 96 is mounted to the planet gear carrier 98 by only a single bearing assembly 100. The elimination of a second bearing assembly from each planet gear shaft reduces the weight of the transmission. As in the previously described embodiments, the planet gear carrier 98 is formed integrally with an output shaft 102 of the transmission. There are also six planet gear shafts 94, 96 mounted on the planet gear carrier 98, with the six planet gear shafts being divided into a first group of three planet gear shafts 94 and a second group of three planet gear shafts 96.

Figure 10:
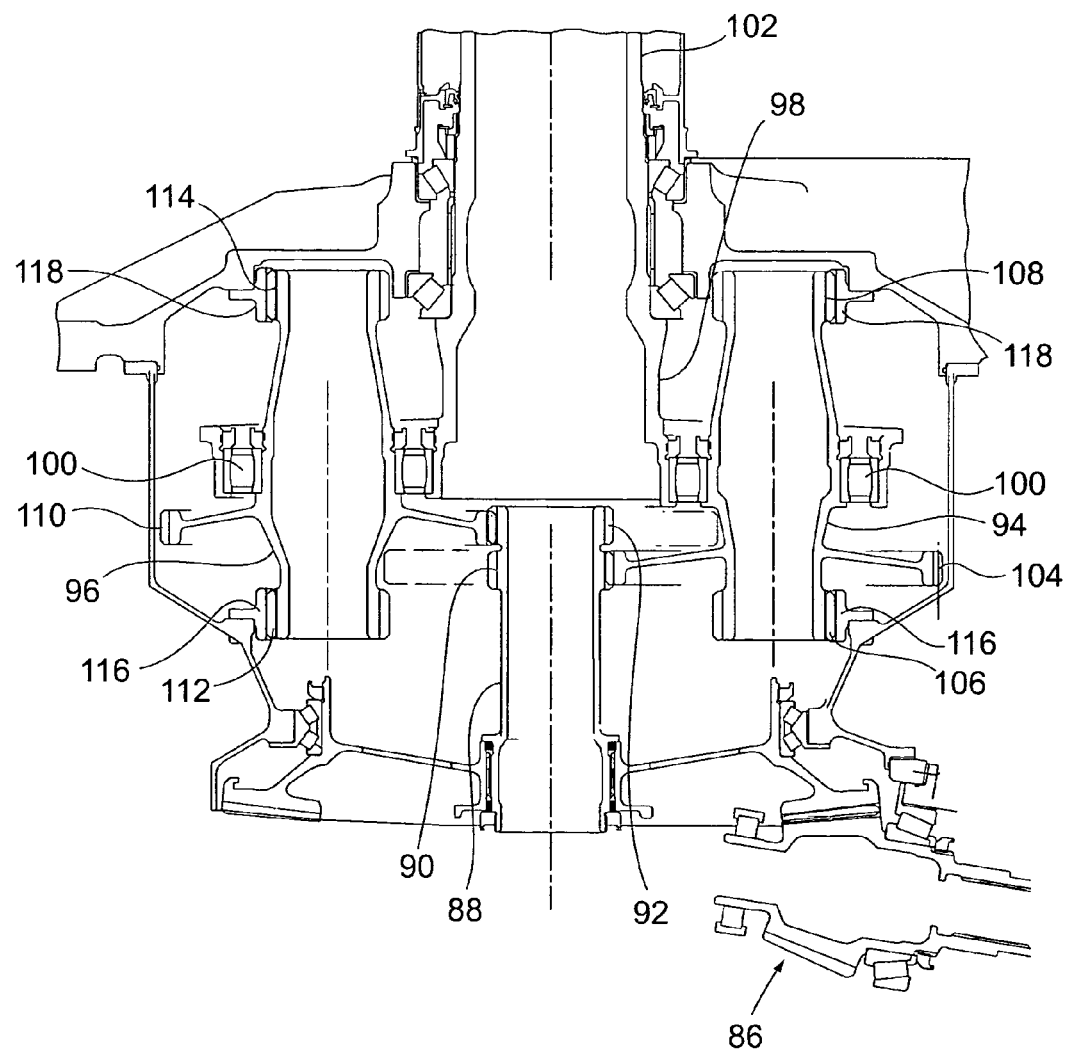
FIG. 10 is a side sectioned view of a further embodiment of the epicyclic gear transmission of the invention.
Figure 11:
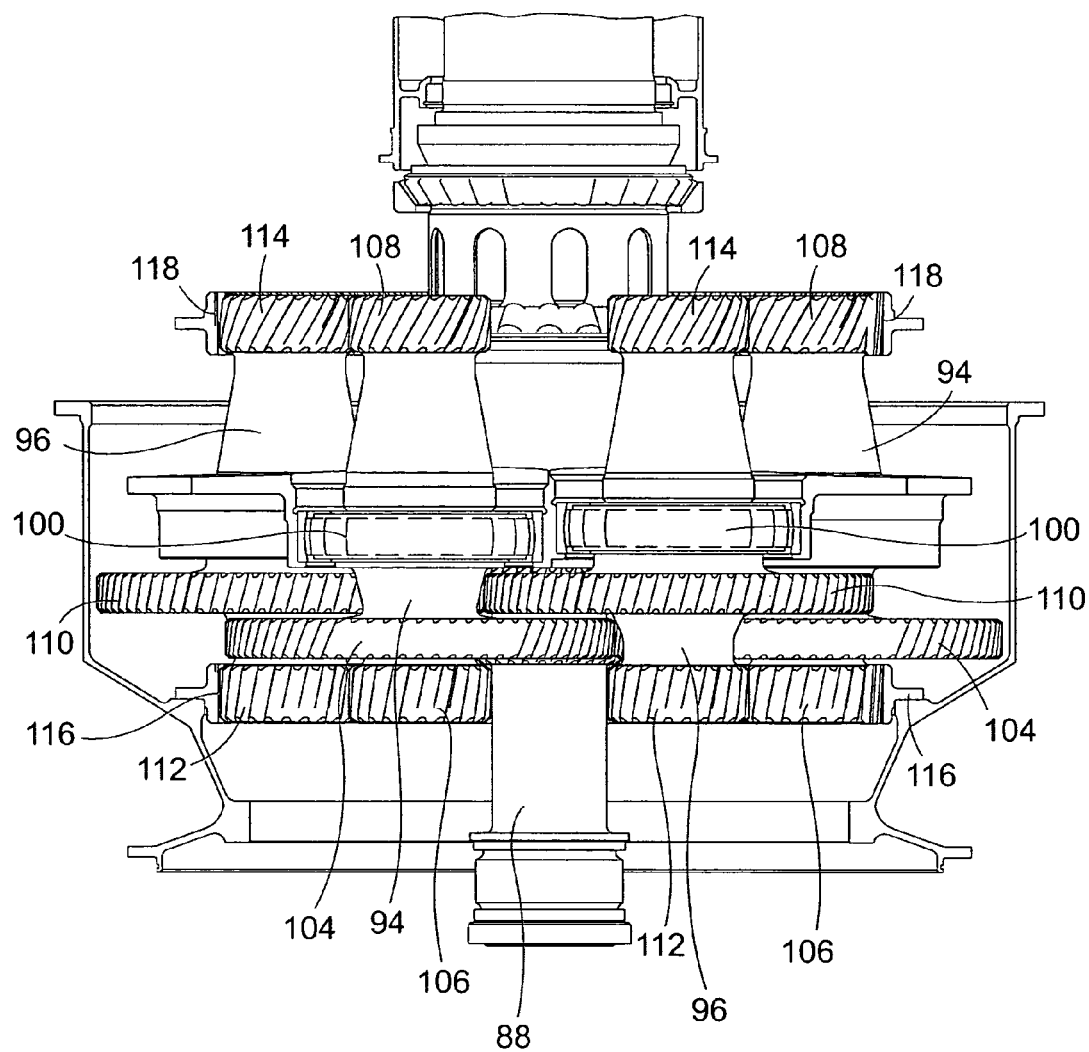
FIG. 11 is a side view of the transmission of FIG. 10.
Figure 12:
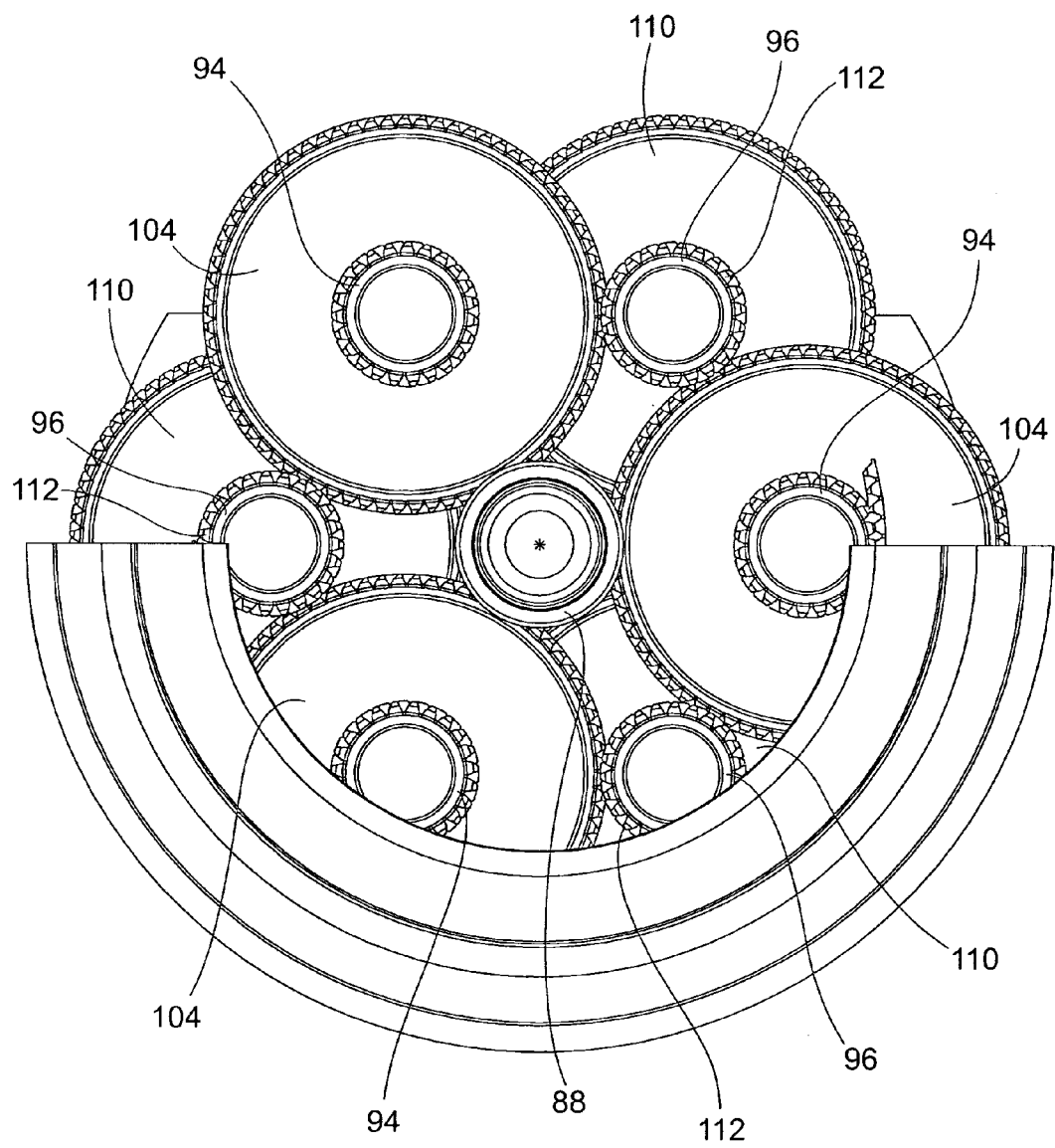
FIG. 12 is a partial view of the input end of the transmission of FIG. 10.
Figure 13:
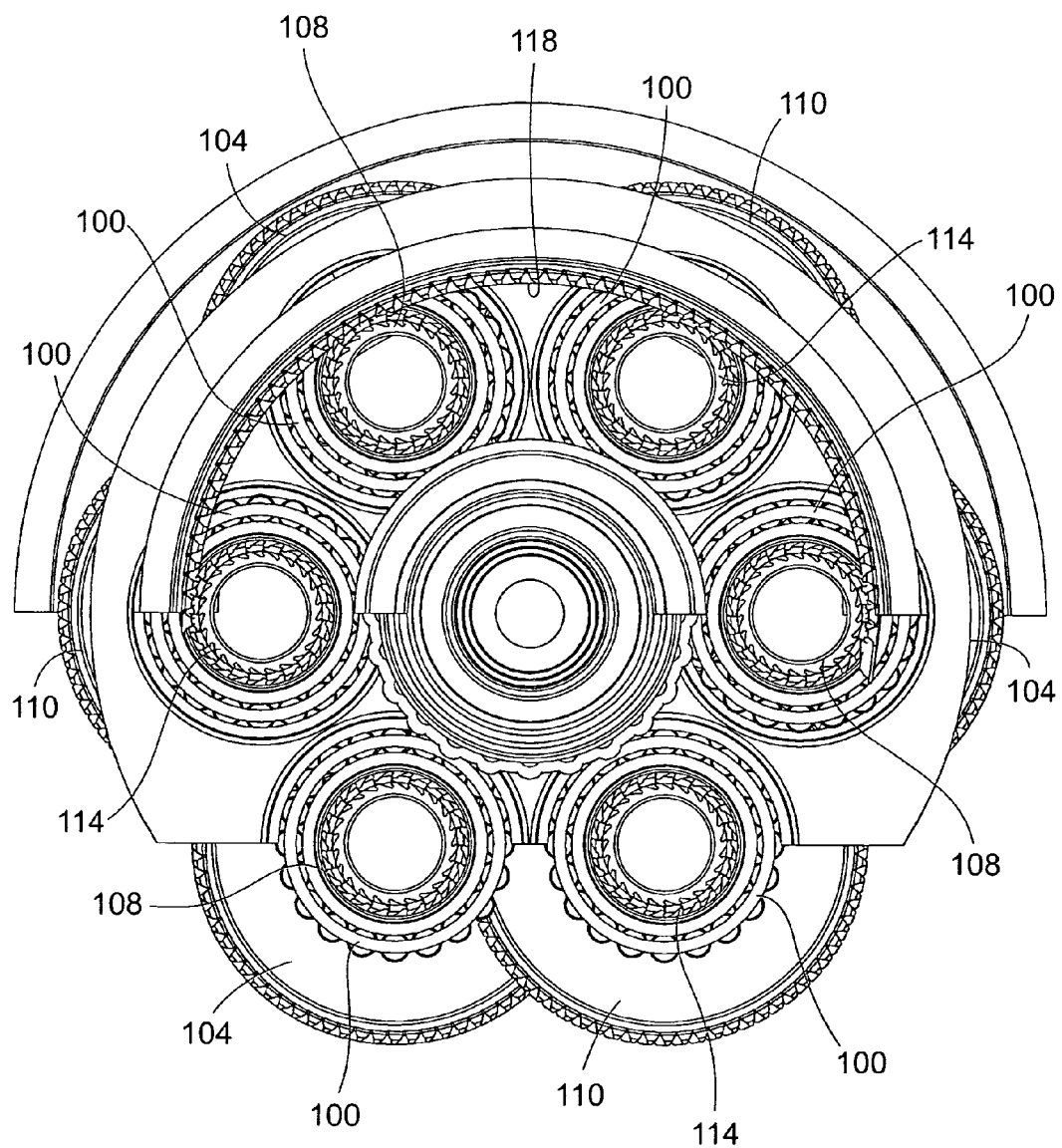
FIG. 13 is a partial view of the output end of the transmission of FIG. 10.

A first cluster of planet gears 104, 106, 108 is mounted on each planet gear shaft 94 of the first group and a second cluster of planet gears 110, 112, 114 is mounted on each planet gear shaft 96 of the second group. Each of the planet gear clusters on each planet gear shaft includes three gears. Each planet gear cluster of the first group includes a larger planet gear 104 that meshes with one of the sun gears 90 and two smaller planet gears 106, 108. Each planet gear cluster of the second group includes a larger planet gear 110 that meshes with the other sun gear 92 and two smaller planet gears 112, 114. As best seen in FIGS. 10 and 11, the smaller planet gears 106, 108, 112, 114 are positioned on axially opposite sides of the larger planet gears 104, 110 and have the same axial positions on their planet gear shafts relative to the gear carrier 98. However, the larger planet gears 104 of the first group and the larger planet gears 110 of the second group are axially staggered on their planet gear shafts. This enables the larger planet gears of the first group 104 to be interleaved with the larger planet gears 110 of the second group. This enables a greater gear reduction by the transmission of FIGS. 10–13 than is provided by the embodiment of the transmission shown in FIGS. 2–5 without increasing the size of the footprint of the transmission. The pairs of smaller planet gears of the first group 106, 108 and the pairs of smaller planet gears of the second group 112, 114 are each double helical gears of opposite hand teeth. The larger planet gears of the first group 104 and the larger planet gears of the second group 110 are also helical gears. The hands of the helical gear teeth of the smaller planet gears 106, 108, 112, 114 and the larger planet gears 104, 110, as well as the helix angles of the gear teeth are designed to counterbalance and eliminate any axial loading on the planet gear shafts 94, 96. This enables the use of only a single bearing assembly 100 on each planet gear shaft 94, 96.

The pairs of smaller planet gears of the first group 106, 108 and the pairs of smaller planet gears of the second group 112, 114 all mesh with a pair of ring gears or internal gears 116, 118. The ring gears 116, 118 are fixed to the transmission housing and are coaxial with the center axis of the input shaft 88. The ring gears 116, 118 are double helical gears of opposite hand teeth.

By employing the larger planet gears 104, 110 that are staggered in their axial positions and interleaved with each other, a larger reduction ratio is provided by the transmission of FIGS. 10–13 without reducing the number of planet gear clusters and planet gear shafts. By doubling the sun gears 90, 92, doubling the smaller planet gears 106, 108 of the first group and the smaller planet gears 112, 114 of the second group, and by doubling the ring gears 116, 118 the load capacity of the transmission is increased and the dual paths through the transmission improve its safety characteristics. The use of helical gears in the transmission also reduces the noise of the transmission's operation.

A fourth embodiment of the epicyclic gear transmission is basically the same as that shown in FIGS. 6–9 except that high-profile contact ratio (HCR) spur gears are used as the sun gears 54, 56 and the planet gears 68, 74 that mesh with the sun gears. This configuration of the epicyclic gear transmission simplifies assembly and allows the double helical planet gears 70, 72, 76, 78 that mesh with the ring gears 80, 82 to be true double helical gears having equal helix angles of opposite hands. This configuration eliminates any axial thrust loads on the stationary internal ring gears 80, 82. The HCR gears also provide noise reduction without the additional thrust load that results from helical gears.

The use of the double helical planet gears on each planet gear shaft that mesh with the internal ring gears of the embodiments of the transmissions described improves the safety of each of the embodiments of the epicyclic gearing transmission. The double helical gears meshing with the internal ring gears separates the gears into two parts that create a dual path transmission system that provides some redundancy in the transmissions. If a gear tooth failure occurs, the gear transmission can continue to operate. A gear tooth failure overloads the remaining gear teeth while the bearings of the planet gear shafts take an increased thrust load. This creates an increase in vibration and noise level in the transmission. The change in the characteristics of the noise and vibration of the transmission signal the occurrence of a failure, thus allowing the aircraft to be landed safely before catastrophic failure occurs.

While the epicyclic gear transmission of the invention has been described above by referring to specific embodiments of the transmission, it should be understood that modifications and variations could be made to the transmissions described without departing from the scope of protection provided by the following claims.

What is claimed is:

1. An epicyclic gear transmission comprising:
    a sun gear having a center axis;
    a ring gear having a center axis, the ring gear center axis being coaxial with the sun gear center axis;
    a plurality of planet gears having center axes that are parallel with the center axis of the sun gear and the ring gear, the plurality of planet gears being spacially arranged around the sun gear, at least some of the plurality of planet gears meshing with the sun gear, and the planet gears meshing with the sun gear having peripheries that are interleaved;
    the ring gear being one of a pair of fixed ring gears;
    at least two planet gears on each planet gear shaft meshing with the pair of ring gears; and,
    the two planet gears on each planet gear shaft that mesh with the pair of ring gears being helical gears with opposite hand helical gear teeth.

2. The epicyclic gear transmission of claim 1, further comprising:
    an input shaft connected to the sun gear for rotating the sun gear.

3. The epicyclic gear transmission of claim 2, further comprising:
    the planet gears meshing with the sun gear being the largest planet gears on the planet gear shafts.

4. The epicyclic gear transmission of claim 2, further comprising:
    a first planet gear of the at least two planet gears on each planet gear shaft meshing with only the sun gear and a second planet gear of the at least two planet gears on each planet gear shaft meshing with only one ring gear.

5. The epicyclic gear transmission of claim 4, further comprising:
    the first planet gear being larger than the second planet gear.

6. The epicyclic gear transmission of claim 4, further comprising:
    the second planet gear of the at least two planet gears on each planet gear shaft meshes with only the one ring gear and a third planet gear on each planet gear shaft meshes with only an other ring gear of the pair of ring gears.

7. The epicyclic gear transmission of claim 1, further comprising:
    the epicyclic gear transmission being a rotor transmission of a rotary wing aircraft.

8. An epicyclic gear transmission comprising:
    a sun gear having a center axis;
    a ring gear having a center axis, the ring gear center axis being coaxial with the sun gear center axis;
    a plurality of planet gears having center axes that are parallel with the center axis of the sun gear and the ring gear, the plurality of planet gears being spacially arranged around the sun gear, at least some of the plurality of planet gears meshing with the sun gear, and the planet gears meshing with the sun gear having peripheries that are interleaved;
    an input shaft connected to the sun gear for rotating the sun gear;
    the ring gear being fixed;
    the plurality of planet gears being mounted on a plurality of planet gear shafts with at least two planet gears of the plurality of planet gears being mounted on each planet gear shaft;
    the ring gear being one of a pair of fixed ring gears;
    at least two planet gears on each planet gear shaft meshing with the pair of ring gears; and,
    the two planet gears on each planet gear shaft that mesh with the pair of ring gears being helical gears with opposite hand helical gear teeth.

9. The epicyclic gear transmission of claim 6, further comprising:

the epicyclic gear transmission being a rotor transmission of a rotary wing aircraft.

10. An epicyclic gear transmission comprising:

a sun gear having a center axis;

a ring gear having a center axis, the ring gear center axis being coaxial with the sun gear center axis;

a plurality of planet gears having center axes that are parallel with the center axis of the sun gear and the ring gear, the plurality of planet gears being spacially arranged around the sun gear, at least some of the plurality of planet gears meshing with the sun gear, and the planet gears meshing with the sun gear having peripheries that are interleaved;

an input shaft connected to the sun gear for rotating the sun gear;

the ring gear being fixed;

the plurality of planet gears being mounted on a plurality of planet gear shafts with at least two planet gears of the plurality of planet gears being mounted on each planet gear shaft;

a carrier supporting each of the planet gear shafts for rotation of the planet gear shafts relative to the carrier; and, a single bearing assembly on each planet gear shaft mounting the planet gear shaft on the carrier.

11. The epicyclic gear transmission of claim 10, further comprising:

the ring gear being one of a pair of fixed ring gears; and, at least two planet gears on each planet gear shaft meshing with the pair of ring gears, the at least two planet gears on each shaft being positioned on axially opposite sides of the bearing assembly on each planet gear shaft.

12. The epicyclic gear transmission of claim 10, further comprising:

the epicyclic gear transmission being a rotor transmission of a rotary wing aircraft.

13. An epicyclic gear transmission comprising:

a sun gear having a center axis;

a ring gear having a center axis, the ring gear center axis being coaxial with the sun gear center axis;

a plurality of planet gears having center axes that are parallel with the center axis of the sun gear and the ring gear, the plurality of planet gears being spacially arranged around and meshing with the sun gear with adjacent planet gears meshing with the sun gear being axially staggered;

the plurality of planet gears being mounted on a plurality of planet gear shafts with at least two planet gears of the plurality of planet gears being mounted on each planet gear shaft;

a carrier supporting each of the planet gear shafts for rotation of the planet gear shafts relative to the carrier; and, a single bearing assembly on each planet gear shaft mounting the planet gear shaft on the carrier.

14. The epicyclic gear transmission of claim 13, further comprising:

the sun gear being driven by an input shaft; and, the ring gear being fixed.

15. The epicyclic gear transmission of claim 14, further comprising:

the axially staggered adjacent planet gears meshing with the sun gear being mounted on adjacent planet gear shafts.

16. The epicyclic gear transmission of claim 14, further comprising:

the planet gears meshing with the sun gear being the largest planet gears on each planet gear shaft.

17. The epicyclic gear transmission of claim 14, further comprising:

the ring gear being one of a pair of fixed ring gears; and, at least two planet gears on each planet gear shaft meshing with the pair of ring gears.

18. The epicyclic gear transmission of claim 17, further comprising:

the plurality of planet gears that mesh with the sun gear do not mesh with the pair of ring gears.

19. The epicyclic gear transmission of claim 13, further comprising:

the epicyclic gear transmission being a rotor transmission of a rotary wing aircraft.

20. An epicyclic gear transmission comprising:

a sun gear having a center axis;

a ring gear having a center axis, the ring gear center axis being coaxial with the sun gear center axis;

a plurality of planet gears having center axes that are parallel with the center axis of the sun gear and the ring gear, the plurality of planet gears being spacially arranged around and meshing with the sun gear with adjacent planet gears meshing with the sun gear being axially staggered;

the sun gear being driven by an input shaft;

the ring gear being fixed;

the ring gear being one of a pair of fixed ring gears;

the plurality of planet gears being mounted on a plurality of planet gear shafts with at least two planet gears on each planet gear shaft meshing with the pair of ring gears; and, the two planet gears on each planet gear shaft that mesh with the pair of ring gears being helical gears with opposite hand helical gear teeth.

21. The epicyclic gear transmission of claim 20, further comprising:

the epicyclic gear transmission being a rotor transmission of a rotary wing aircraft.

* * * * *